US 6,719,215 B2

(12) United States Patent
Drouillard

(10) Patent No.: US 6,719,215 B2
(45) Date of Patent: Apr. 13, 2004

(54) WINDSHIELD WASHER SYSTEM FOR AUTOMOTIVE VEHICLE

(75) Inventor: Jerome R. Drouillard, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 158 days.

(21) Appl. No.: 09/682,691

(22) Filed: Oct. 5, 2001

(65) Prior Publication Data

US 2003/0066907 A1 Apr. 10, 2003

(51) Int. Cl.[7] ............................. B05B 1/10; B60S 1/46
(52) U.S. Cl. .............................. 239/284.1; 239/284.2
(58) Field of Search ......................... 239/284.1, 284.2, 239/67, 69, 70, 128, 130, 135, 225.1, 232, 240, 242, 537, 538, 539; 15/250.01–250.06; 134/6, 18

(56) References Cited

U.S. PATENT DOCUMENTS

| 4,317,073 A | * | 2/1982 | Blaszkowski ................ 318/483 |
| 4,508,267 A | * | 4/1985 | Stouffer ........................ 239/11 |
| 5,261,254 A | | 11/1993 | Cattane |
| 5,762,271 A | * | 6/1998 | Lind et al. ................ 239/284.2 |
| 5,946,763 A | | 9/1999 | Egner-Walter et al. |

FOREIGN PATENT DOCUMENTS

| CA | 2176539 A | * | 11/1997 | ............. B60S/1/50 |

* cited by examiner

Primary Examiner—Davis Hwu

(57) ABSTRACT

A windshield washer system for an automotive vehicle includes a fluid reservoir, a pump mounted within the fluid reservoir, a heater mounted in proximity to the pump so as to provide heat to the fluid contained within the reservoir and a nozzle operatively associated with the pump for applying fluid from the reservoir to an outside surface of the automotive vehicle at an even sub-freezing temperatures, with aqueous-based fluids either none, or minimal freezing point depressants contained therein.

8 Claims, 1 Drawing Sheet

WINDSHIELD WASHER SYSTEM FOR AUTOMOTIVE VEHICLE

BACKGROUND OF INVENTION

The present invention relates to a system for providing fluid to the exterior surface of a vehicle, such as a windshield, for the purpose of cleaning same.

Windshield washer systems have been used in automotive vehicles for many years. As is well known, such systems typically apply a fluid which aids the action of the wiper blades in cleaning the windshield or other exterior surface, such as a lamp lens. Because many vehicles are required to operate in ambient temperatures below freezing, it has been necessary to provide an additive to the fluid so as to depress its freezing point. Typically, methanol is used to depress the freezing point of windshield washer fluid. However, as vehicle emissions regulations become increasingly more stringent, it has become increasingly more desirable to limit the emissions of all forms of hydrocarbons from the vehicle. Accordingly, it is desirable to limit and, in this case, eliminate the use of methanol. Of course, at ambient temperatures below freezing, it is difficult to use neat water. The present invention solves the problems associated with using neat water and allows the cleaning of a windshield with neat water or perhaps with water having a small amount of soap therein, but in either case without the use of methanol.

SUMMARY OF INVENTION

A windshield washer system for an automotive vehicle includes a fluid reservoir, a pump mounted within the fluid reservoir and a heater mounted in proximity to the pump so as to provide heat to fluid contained within the reservoir. The system further includes a nozzle operatively associated with the pump for applying fluid from the reservoir to an outside surface of an automotive vehicle. The heater may comprise an electric resistance element, such as a positive temperature coefficient element mounted about a pumping chamber of the pump. In any event, the heater provides sufficient heat to the fluid contained within the reservoir to prevent water in the fluid from freezing at ambient temperatures normally encountered by automobiles.

According to another aspect of the present invention, a nozzle incorporated in the present system may be of the telescoping variety such that it has a first position for spraying and a second, or retracted, position when it is not spraying. In this fashion, a neat, uncluttered appearance may be achieved, while protecting the nozzle from damage. In any event, the nozzle is close-coupled to the pump, so as to minimize the fluid volume between the pump and nozzle. This promotes drainback of fluid from the nozzle to the pump, while allowing heat to flow from the pump to the nozzle, thereby further inhibiting freezing of water within the nozzle.

It is an advantage of the present system that separated fluid lines and nozzles are eliminated, with the entire system being contained in a single assembly, so as to allow the protection of the fluid and the entire system from freezing with a single heat source.

It is a further advantage of the present system that the use of hydrocarbon-based freezing point depressants may be eliminated with the present system.

It is another advantage of the present system that the nozzle included with the system is self-draining so as to allow the nozzle to purge itself of fluid when the system is not being energized and therefore to further protect the system against freezing.

DETAILED DESCRIPTION

Figure 1:
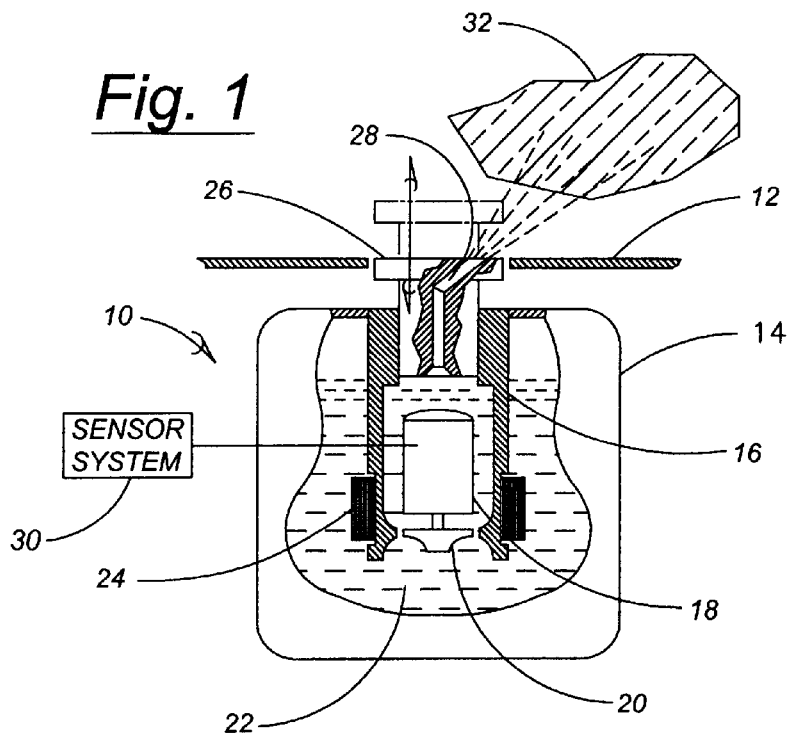
FIG. 1 is a partially schematic representation of a windshield washer system according to the present invention.

As shown in FIG. 1, windshield washer system 10 is mounted in proximity to an exterior panel 12 of an automotive vehicle. Fluid 22 contained within reservoir 14 is picked up by a pump assembly including pump housing 16 which has pump motor 18 and pump element 20 mounted therein. Upon a signal from the driver or other source, motor 18 energizes pump element 20 and fluid is caused to be discharged through nozzle 26 which has fluid passage 28 formed therein. Those skilled in the art will appreciate in view of this disclosure that pump motor 18 and pumping element 20 could comprise a variety of different combinations of brushless and brush-type AC and DC motors with pump element comprising anyone of a number of different configurations, such as regenerative turbine or gerotor. These variations and refinements are committed to those wishing to practice the present invention. Passage 28 of nozzle As further shown in FIG. 1, nozzle 26 has a retracted position shown in solid lines and an extended position shown in dotted lines. Thus, when motor 18 is energized and pump 20 is caused to pump fluid into passage 26, the force of the resulting fluid pressure upon nozzle 26 causes nozzle 26 to assume the extended position and fluid 22 is deposited upon an exterior surface of the vehicle, such as windshield 32. Because nozzle 26 has both an extended and retracted position, the nozzle is protected from damage when it is not being used to spray fluid 22 upon a windshield of the vehicle.

Figure 2:
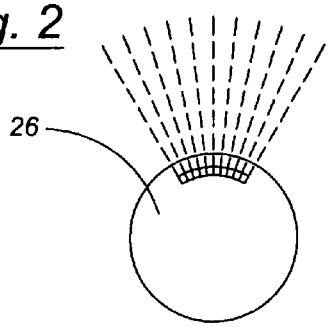
FIG. 2 is a partially schematic representation of a fluidic nozzle according to an aspect of the present invention.

FIG. 2 shows a first type of nozzle 26 for use with a system according to the present invention in which the nozzle is a fluidic nozzle, which produces a fan-like spray capable of covering a good portion of a window or windshield 32 of a vehicle. The nozzle shown in FIG. 2 will not have any sort of device to move it in a rotational direction. Rather, this nozzle may be of the "fluidic" variety, in which a fixed orifice produces a dynamic wave-like motion of the fluid being sprayed.

Figure 3:
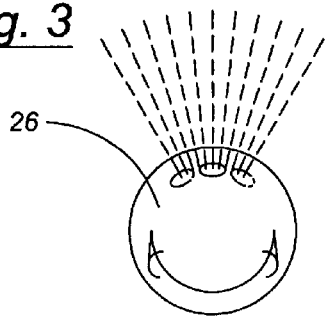
FIG. 3 is a partially schematic representation of a rotating nozzle according to another aspect of the present invention.

The nozzle of FIG. 3 is a rotatable nozzle, which is driven by motor 18 through a gear box (not shown). Such gear boxes may be driven electrically or by fluid power and are typically known to those skilled in the art and suggested by this disclosure. Regardless of the type of gear drive or motor drive used, the nozzle of FIG. 3 is caused to rotate or oscillate back and forth so as to deposit fluid upon a substantially greater area of windshield 32 or other exterior surface of the vehicle. Because nozzle 26 is close-coupled to the pump, the volume of liquid extending between the pump and the nozzle is minimized. This helps to avoid freezing for two reasons. First, liquid is allowed do drainback through passage 28, and heat will be conducted from pump housing 16 and through the liquid to nozzle 26, thereby further inhibiting freezing.

A stated purpose and advantage of the present invention resides in the use of an aqueous fluid without the need for a freezing point depressant. This is accommodated and achieved by means of heater 24, which may comprise a positive temperature coefficient (PTC) heater. PTC heaters are known to those skilled in the art and have been used for many years in automotive vehicles. The virtue of a PTC heater resides in the fact that the temperature is self-limiting because as the temperature of the device increases, so does its resistance, thereby limiting the amount of current flowing through the PTC heater. It is noted that the PTC heater is mounted in proximity to the pump and, in fact, mounted upon a portion of pump housing 16 so as to impart heat to pump housing 16 sufficient to prevent liquid from freezing both inside pump housing 16 and outside pump housing 16. Pump housing 16 may advantageously be constructed of heat conducting material, which will thereby allow conductive heating of nozzle 16, so as to prevent water from freezing in passage 28. In any event, fluid 22 may be maintained above its freezing temperature. Those skilled in the art will appreciate in view of this disclosure that other types of heaters and arrangements for mounting such heaters may be selected for a system according to the present invention.

If it is desired to coordinate windshield heating with operation of the present washer system, sensor system 30 may be provided for determining when windshield 32 has been warmed sufficiently to permit the application of neat water without freezing. In essence, sensor system 30 uses known technology, such as a thermistor, to detect the presence of sub-freezing temperatures in the windshield glazing. If such temperatures are detected, operation of motor 18 and pump 20 will be inhibited, until such time as the windshield is sufficiently warmed to avoid icing.

While the best mode for carrying out the invention has been described in detail, those familiar with the art to which this invention relates will recognize various alternative designs and embodiments for practicing the invention as defined by the following claims.

What is claimed is:

1. A windshield washer system for an automotive vehicle, comprising:

a fluid reservoir;

a pump mounted within said fluid reservoir; and a heater mounted in proximity to said pump, so as to provide heat to fluid contained within said reservoir; and a nozzle coupled directly to and extending from a housing of said pump, for applying fluid from said reservoir to an outside surface of an automobile, wherein said nozzle has a first position for spraying, and a second position when it is not spraying, with said nozzle being self-draining.

2. The windshield washer system according to claim 1, wherein said heater comprises an electric resistance element mounted about a pumping chamber of said pump.

3. The windshield washer system according to claim 1, wherein said heater comprises a positive temperature coefficient electric resistance element.

4. The windshield washer system according to claim 1, wherein said heater provides sufficient heat to fluid contained within said reservoir to prevent water in the fluid from freezing at ambient temperatures normally encountered by automobiles.

5. The windshield washer system according to claim 1, wherein said fluid comprises neat water.

6. A The windshield washer system for an automotive vehicle, comprising:

a fluid reservoir containing an aqueous washer fluid;

a pump mounted within said fluid reservoir; and a heater mounted in proximity to said pump, so as to provide heat to the fluid contained within said reservoir sufficient to prevent said fluid from freezing;

a nozzle coupled directly to and extending from a housing of said pump, for applying fluid from said reservoir to an outside surface of an automobile, wherein said nozzle has a first position for spraying, and a second position when it is not spraying; and a sensor system for determining the temperature of the windshield to which the fluid is to be applied, with said sensor system inhibiting the operation of said pump in the event that said temperature is below a predetermine threshold.

7. The windshield washer system of claim 6, wherein said nozzle comprises a fluidic nozzle.

8. The windshield washer system of claim 6, wherein said nozzle comprises a motor driven oscillating sprayer.

\* \* \* \* \*